US012779442B2

(12) United States Patent
Barron et al.

(10) Patent No.: US 12,779,442 B2
(45) Date of Patent: Nov. 3, 2026

(54) AMMONIA SLIP CATALYST FILTER

(71) Applicant: JOHNSON MATTHEY PUBLIC LIMITED COMPANY, London (GB)

(72) Inventors: Ross Barron, Royston (GB); Guy Richard Chandler, Royston (GB); Francesco Foschi, Royston (GB); Stuart David Reid, Royston (GB); Mark Walton, Royston (GB)

(73) Assignee: Johnson Matthey Public Limited Company, London (GB)

( * ) Notice: Subject to any disclaimer, the term of this patent is extended or adjusted under 35 U.S.C. 154(b) by 486 days.

(21) Appl. No.: 18/540,982

(22) Filed: Dec. 15, 2023

(65) Prior Publication Data

US 2024/0226864 A1 Jul. 11, 2024

(30) Foreign Application Priority Data

Dec. 20, 2022 (EP) .................................... 22215069

(51) Int. Cl.
*B01J 35/00* (2006.01)
*B01D 53/94* (2006.01)
(Continued)

(52) U.S. Cl.
CPC .......... *B01J 35/19* (2024.01); *B01D 53/9418* (2013.01); *B01D 53/9431* (2013.01); *B01D 53/9436* (2013.01); *B01D 53/9472* (2013.01); *B01J 21/04* (2013.01); *B01J 23/10* (2013.01); *B01J 23/6482* (2013.01); *B01J 29/763* (2013.01); *B01J 35/394* (2024.01); *B01J 35/56* (2024.01); *F01N 3/2066* (2013.01); *F01N 3/2825* (2013.01); *B01D 2255/1021* (2013.01);
(Continued)

(58) Field of Classification Search
CPC ........ B01D 53/9472; B01D 2255/1021; B01D 2255/20761; B01D 2255/50; B01D 2255/9037; B01D 2255/9155; B01D 2257/404; B01D 2257/406; B01D 2258/012; B01J 21/04; B01J 23/10; B01J 23/6482; B01J 29/763; F01N 3/2066; F01N 3/2825; F01N 2370/04; F01N 2510/063; F01N 2510/0684
See application file for complete search history.

(56) References Cited

U.S. PATENT DOCUMENTS

2018/0111089 A1* 4/2018 Li ...................... B01D 46/2429
2018/0264446 A1* 9/2018 Burgess ............. B01D 53/9418
(Continued)

FOREIGN PATENT DOCUMENTS

WO WO-2022128523 A1 * 6/2022 ............. F01N 3/103

*Primary Examiner* — Shafiq Mian
(74) *Attorney, Agent, or Firm* — BakerHostetler

(57) ABSTRACT

A catalytic wall-flow filter for the treatment of an exhaust gas is disclosed. The catalytic wall-flow filter comprise at least a first, a second and a third catalytic layers: the first catalytic layer extends from the inlet-end of the substrate and comprises a first SCR composition; the second catalytic layer is provided in or on the walls of the inlet channels, extending from the inlet-end of the substrate, and comprises a PGM-containing composition; the third catalytic layer is provided in or on the walls of the outlet channels, extending from the outlet-end of the substrate, and comprises a second SCR composition.

17 Claims, 9 Drawing Sheets

(51) Int. Cl.
*B01J 21/04* (2006.01)
*B01J 23/10* (2006.01)
*B01J 23/648* (2006.01)
*B01J 29/76* (2006.01)
*B01J 35/30* (2024.01)
*B01J 35/56* (2024.01)
*F01N 3/20* (2006.01)
*F01N 3/28* (2006.01)

(52) U.S. Cl.
CPC .............. *B01D 2255/20761* (2013.01); *B01D 2255/50* (2013.01); *B01D 2255/9037* (2013.01); *B01D 2255/9155* (2013.01); *B01D 2257/404* (2013.01); *B01D 2257/406* (2013.01); *B01D 2258/012* (2013.01); *F01N 2370/04* (2013.01); *F01N 2510/063* (2013.01); *F01N 2510/0684* (2013.01)

(56) References Cited

U.S. PATENT DOCUMENTS

2018/0353905 A1* 12/2018 Li ...................... B01D 46/2459
2021/0162344 A1 6/2021 Chen

* cited by examiner

AMMONIA SLIP CATALYST FILTER

The present invention relates to a catalyst article for use as an ammonia slip catalyst. In particular, the ammonia slip catalyst is provided on a wall-flow filter. The invention further relates to an exhaust gas treatment system comprising the catalyst article and to its use. The catalyst article is designed to address particulate emissions resulting from the upstream addition of reductants such as ammonia or urea, while maintaining good exhaust treatment performance.

Exhaust gas generated in lean-burn and diesel engines is generally oxidative. $NO_x$ needs to be reduced selectively with a catalyst and a reductant in a process known as selective catalytic reduction (SCR) that converts $NO_x$ into elemental nitrogen ($N_2$) and water. In an SCR process, a gaseous reductant, typically anhydrous ammonia, aqueous ammonia, or urea, is added to an exhaust gas stream prior to the exhaust gas contacting the catalyst. The reductant is absorbed onto the catalyst and the $NO_x$ is reduced as the gases pass through or over the catalysed substrate. In order to maximize the conversion of $NO_x$, it is often necessary to add more than a stoichiometric amount of ammonia to the gas stream. However, release of the excess ammonia into the atmosphere would be detrimental to the health of people and to the environment. In addition, ammonia is caustic, especially in its aqueous form. Condensation of ammonia and water in regions of the exhaust line downstream of the exhaust catalysts can result in a corrosive mixture that can damage the exhaust system. Therefore, the release of ammonia in exhaust gas should be eliminated.

Even the best SCR catalyst will not achieve maximum $NO_x$ reductions in a system with non-uniform $NH_3$ distribution. Significant variation in load, exhaust flow rate and $NO_x$ concentration make it difficult to deliver $NH_3$ to the catalyst in the 1:1 ammonia $NO_x$ ratio (ANR) required by reaction stoichiometry. Non-uniform $NH_3$ distribution can result in incomplete $NO_x$ conversion where localized ANR is low, and in $NH_3$ slip where ANR is high.

In many conventional exhaust systems, an ammonia oxidation catalyst (also known as an ammonia slip catalyst or "ASC") is installed downstream of the SCR catalyst to remove ammonia from the exhaust gas by converting it to nitrogen. Ammonia slip catalysts are well known in the art. The purpose of an ammonia slip catalyst is to treat any ammonia passing through an upstream SCR catalyst.

To overcome the difficulty of attaining ideal stoichiometry, ASC technology combines oxidation catalyst and SCR catalyst functions on a flow-through (FT) substrate to improve $NO_x$ reduction while maintaining low $NH_3$ slip. The ASC allows continuous operation of an upstream SCR at higher ANR, compensating for non-uniform $NH_3$ distribution and boosting $NO_x$ conversion (on the upstream SCR) while maintaining low $NH_3$ slip.

In an ASC, the oxidation catalyst and the SCR catalyst can be coated on the substrate following different design strategies, one of the most common being the so-called "Two-layer ASC" design. The two-layer ASC design is based on the sequential coating of two layers (PGM-layer and SCR-layer) on the walls of the flow-through channels. A functional ASC design will convert in the oxidation layer just a portion of the ammonia available in the exhaust. The remaining ammonia fraction will then be used as a reductant in the SCR layer, ideally allowing for the overall conversion of ammonia into just water, elemental nitrogen, and the smallest possible amounts of $N_2O$ and $NO_x$.

A typical ASC is described in WO2016205509. This document discloses an ASC comprising a combination of platinum on a support with low ammonia storage and a first SCR catalyst. The preferred combination is a bi-layer having a top layer comprising the first SCR catalyst and a bottom layer comprising the platinum on a support with low ammonia storage. In use, some excess ammonia can be stored in the upper SCR catalyst layer. Some of the excess ammonia can pass through to the Pt where it may be oxidised to $NO_x$. The $NO_x$ then passes back through the SCR layer where it is treated with the stored ammonia to provide $N_2$. In this way the excess slipped ammonia is stored and put to use, rather than being emitted to the atmosphere.

Another configuration of an ASC is described in US20150037233.

Particulate emissions are a well-known problem for diesel engine exhaust gas treatment systems. It is known to address these emissions with the use of a filter. Known types of filter include diesel particulate filters (DPF) and catalysed soot filters (CSF). These capture soot from the exhaust and can be regenerated through an increase in exhaust temperature to burn off the accumulated soot. The conventional substrate for a DPF or a CSF is a so-called wall-flow filter.

EP2483537 discloses four-way catalysts for diesel exhaust. As the name implies, all four of the main emissions in the exhaust—CO, HC, $NO_x$, and soot—are removed in a single component.

EP2567081 discloses a catalytic article for treating an exhaust gas stream containing particulate matter, hydrocarbons, CO, and ammonia. In a first embodiment of the disclosure, the article comprises a substrate having an inlet end and an outlet end defining an axial length a first catalyst coating including a platinum group metal, the first catalyst coating extending from the outlet end toward the inlet end over less than the entire axial length of the substrate; and a second catalyst coating including a catalyst for selective catalytic reduction (SCR) of nitrogen oxides, the second catalyst coating extending from the inlet end toward the outlet end over less than the entire axial length of the substrate and overlapping a portion of the first catalyst coating.

EP3277411 and EP3277403 disclose multi-zone catalyst articles, methods of manufacturing multi-zone catalyst articles, and methods for controlling emissions in diesel engine exhaust streams with multi-zone catalyst articles, where the emission treatment system of various embodiments effectively treats diesel engine exhaust with a single multi-zone catalyst article.

EP3357558 discloses a catalyst for purifying the exhaust gases of diesel engines, said catalyst having several material zones.

As emissions standards become stricter, it is increasingly important to ensure that the emissions output of an exhaust system addresses concerns with particulate emissions as well as species such as $NO_x$ and $NH_3$.

Accordingly, it is an object of the present invention to provide an ammonia slip catalyst suitable for meeting expected future regulations on particulate emissions, or at least to tackle problems associated therewith in the prior art or provide a commercially viable alternative thereto.

According to a first aspect there is provided a catalyst article for the treatment of an exhaust gas, the catalyst article comprising:

- a wall-flow filter substrate having inlet channels open at an inlet-end of the substrate and closed at an outlet-end of the substrate, the inlet channels adjacent outlet channels which are closed at the inlet-end of the substrate and open at the outlet-end of the substrate, the wall-flow filter comprising at least first, second and third catalytic layers, wherein:

(i) the first catalytic layer extends from the inlet-end of the substrate and comprises a first SCR composition;

(ii) the second catalytic layer is provided in or on the walls of the inlet channels, extending from the inlet-end of the substrate, and comprises a PGM-containing composition, wherein:

when the second catalytic layer is provided on the walls of the inlet channel, the first catalytic layer is provided on the second catalytic layer, and when the second catalytic layer is provided in the walls of the inlet channels, the first catalytic layer is provided on the walls of the inlet channels; and (iii) the third catalytic layer is provided in or on the walls of the outlet channels, extending from the outlet-end of the substrate, and comprises a second SCR composition;

wherein a ratio of the PGMs in the second catalytic layer in g per $ft^3$ to the total amount of the first and second SCR compositions in the first and third catalytic layers in g per $in^3$ is from 1.5:8 to 5:8, preferably 2:8 to 4:8, and more preferably 2:8 to 3:8.

The present disclosure will now be described further. In the following passages different aspects/embodiments of the disclosure are defined in more detail. Each aspect/embodiment so defined may be combined with any other aspect/embodiment or aspects/embodiments unless clearly indicated to the contrary. In particular, any feature indicated as being preferred or advantageous may be combined with any other feature or features indicated as being preferred or advantageous. It is intended that the features disclosed in relation to the product may be combined with those disclosed in relation to the method and vice versa.

In the following the term "ammonia slip catalyst filter" or "ASCF" is used as a short-hand for the structure of the catalyst article as described herein.

It has recently been observed that the use of reductant (especially urea/ammonia) injection into an exhaust gas stream can lead to the production of certain aggregated compounds and ammonium salts. These are species formed by the reaction and polymerisation of the reductant before it can take part in the SCR reaction. The polymerised material then takes the form of additional fine particulate matter than can be released to the atmosphere, contrary to strict emissions requirements.

A discussion of these polymerised particulate emissions may be found in SAE 2017-01-0915. Here it is explained that depending on the urea doser, decomposition reaction tube (DRT) design and operating conditions, incomplete decomposition of injected urea could lead to solid urea deposit formation in the diesel aftertreatment system. The formed deposits could lead to engine back pressure increase and NOx treatment performance deterioration. The formed urea deposits could be further transformed to chemically more stable substances upon exposure to hot exhaust gas, therefore it is critical to understand this transformation process. The results of the author's experiments indicate that 1) below urea melting temperature (130° C.), the formed urea deposits are still primarily urea; 2) in the temperature range 130-190° C., urea transforms to a combination of urea, biuret and CYA; and 3) above biuret melting temperature (190° C.), CYA is primarily formed with some features of ammelide. Above 200° C. exposure, urea experiences fast chemical transformation via urea decomposition, biuret formation followed by subsequent biuret decomposition, and turns into CYA in a short time.

Thus, the polymerisation of urea and ammonia components in the hot exhaust gas conditions can lead to the formation of polymeric particulate matter and this can have some thermally stability. This particulate matter is typically very fine, but it is exactly this sort of fine material that is now the subject of ever more stringent regulation. Furthermore, since the formation of the particulate matter can only occur after the reductant is dosed into the exhaust gas treatment system, it is generally formed both after any conventional particulate filter in the system (DPF or CSF) and under a lower temperature environment (i.e., underfloor configurations) where conventional regeneration of such filters would be difficult.

The present inventors have now discovered that it is possible to address these concerns through the provision of a catalyst article as described herein. In particular, the article is able to provide comparable ASC performance to a standard flow-through monolith, while reducing or avoiding particulate emissions. Furthermore, the inventors have found that in order to match the $N_2O$ and $NO_x$ performance of a standard flow-through ASC it is possible and, indeed, desirable to use a reduced amount of PGMs. This leads to a saving in cost and an optimised performance.

It should be noted that an ASC is often provided as the rear portion of an SCR catalyst article. That is, a flow-through monolith may be provided with a PGM layer on an outlet surface portion and an SCR layer provided along the entire length of the monolith. In other embodiments the SCR and the bilayer ASC may be provided on separate monoliths but immediately sequentially arranged. The present performance comparisons are made with respect to the ASC portion only (i.e. not including the upstream SCR-only portion of such combined monoliths). In use, the ASCF disclosed herein will typically be preceded by a separate SCR monolith as discussed below.

The present invention relates to a catalyst article. By catalyst article it is meant a structure as described herein having catalytic properties. The catalytic properties derive from materials included in the structure or coated thereon. The article as defined herein includes both a coated catalytic substrate as described herein and also a processed and canned ASCF unit suitable for installation on an automobile. The catalyst article provides a catalyst that is effective at reducing ammonia slip and particulate emissions when used downstream of an SCR process.

The present invention relates to a catalyst article for the treatment of an exhaust gas. That is, the catalyst article can be used to treat an exhaust gas derived from a combustion process, such as from an internal combustion engine (whether mobile or stationary), a gas turbine for stationary, marine, or locomotive applications, and coal or oil-fired power plants. The article may also be used to treat gas from industrial processes such as refining, from refinery heaters and boilers, furnaces, the chemical processing industry, coke ovens, municipal waste plants and incinerators, etc. In a particular embodiment, the method is used for treating exhaust gas from a gas turbine or a lean-burn engine. The treatment is performed to remove undesired components of the exhaust gas, such as $NO_x$ and particulate matter. Other species such as CO and uncombusted hydrocarbons (HC) may also be treated by components of an exhaust treatment system.

The catalyst article comprises a wall-flow filter substrate. These are extremely well known in the art. A wall-flow filter has inlet channels open at an inlet-end of the substrate and closed at an outlet-end of the substrate, the inlet channels adjacent outlet channels which are closed at the inlet-end of the substrate and open at the outlet-end of the substrate. The alternate open and closed channels mean that, in use, exhaust gas entering an inlet channel is forced through the walls dividing the channels to leave via an open outlet channel. The porosity of the walls and the provision of particular coating regions and layers ensure that the gases are treated while they pass through the wall.

Typical ceramic wall flow filter substrates are composed of refractory materials such as cordierite or silicon-carbide. A common construction is a multi-passage honeycomb structure having the ends of alternate passages on the inlet and outlet sides of the honeycomb structure plugged. This construction results in a checkerboard-type pattern on either end.

The monolithic substrates used for a wall flow filter may contain up to about 400 flow passages (or "cells") per square inch ($(2.54\ cm)^2$) of cross section, although far fewer may be used. For example, the carrier may have from 7 to 400, specifically from 100 to 400 cells per square inch ("cpsi"). The cells can have cross sections that are rectangular, square, circular, oval, triangular, hexagonal, or are of other polygonal shapes.

Wall flow substrates are generally composed of ceramic-like materials such as cordierite, alpha-alumina, silicon carbide, silicon nitride, zirconia, mullite, spodumene, alumina-silica-magnesia or zirconium silicate, or of refractory metals such as stainless steel. Such materials are able to withstand the environment, particularly high temperatures, encountered in treating the exhaust streams. Ceramic wall flow substrates are typically formed of a material having a porosity of about 40 to 70. The term "porosity" as used in this context is understood as being determined according to mercury porosity measurement according to DIN 66133. According to embodiments of the present invention, wall flow substrates are specific having a porosity in the range from 38 to 75.

The wall-flow filter of the invention comprises at least first, second and third catalytic layers. It is preferred that these are the only layers present in the catalyst article. Nonetheless, it should be appreciated that other conventional layers may be present or the first, second and third layers may themselves be composed of one or more sub-layers having the same or different formulations. That is, the first catalytic layer could be comprised of two layers comprising SCR catalysts, either to build up a single SCR catalyst formulation or to provide two layers of different SCR catalyst formulations. In a most preferred embodiment, the three catalytic layers are the only layers present and are each provided as a singly applied layer.

The first catalytic layer extends from the inlet-end of the substrate and comprises a first SCR composition. Preferably the first catalytic layer extends up to 100% of a longitudinal length of the substrate extending from the inlet-end to an outlet-end, preferably from 70 to 90% of the longitudinal length. Since the coating methods, especially for thin in-wall coatings, for applying such compositions typically involve dipping the substrate in a washcoat, a substantially 100% coating will extend fully along the inside of the inlet channel up to the plug blocking the outlet-end of the channel. For on-wall coatings these may be applied by drawing a washcoat into the substrate by application of a strong and short vacuum.

A preferred coating of up to 90% of the length will leave a portion of the walls at the end of the channel adjacent the plug without any coating thereon. Accordingly, the most preferred coating of 70 to 90% of the length provides an inlet region of the inlet channels provided with the composition and a region distal from the inlet end which is free from the composition. In use, the first catalytic layer will be the first catalytic element of the article contacted by the exhaust gas to be treated.

In some preferred embodiments the second and third catalytic layers do not overlap and together extend 100% of a longitudinal length of the substrate extending from an outlet-end to an inlet end. These embodiments have been found to achieve good conversion while minimising back-pressure. In these embodiments, preferably the second catalytic layer is provided in the walls of the inlet channels and the third catalytic layer is provided in the walls of the outlet channels.

Preferably the catalytically active SCR components of the first and/or second SCR compositions comprise, and preferably consist, of one or more metal-exchanged zeolites. This does not preclude the presence of additional non-catalytic binders or processing aids, as are conventionally used in washcoat formation. These are discussed further below.

Preferably the first SCR composition comprises a copper-promoted zeolite, an iron-promoted zeolite, a manganese-promoted zeolite, or a combination thereof. The total amount of Cu, Mn and Fe is preferably present in an amount of from 0.1 to 5 wt % and most preferably from 1 to 3 wt %, by weight of the promoted zeolite. The second SCR composition may be independently selected from the same materials set out herein for the first SCR composition.

A zeolite is a microporous aluminosilicate having any one of the framework structures listed in the Database of Zeolite Structures published by the International Zeolite Association (LZA). The framework structures include, but are not limited to those of the CHA, FAU, BEA, MFI, MOR types. Non-limiting examples of zeolites having these structures include chabazite, faujasite, zeolite Y, ultrastable zeolite Y, beta zeolite, mordenite, silicalite, zeolite X, and ZSM-5. Aluminosilicate zeolites can have a silica/alumina molar ratio (SAR) defined as $SiO_2/Al_2O_3$) from at least about 5, preferably at least about 20, with useful ranges of from about 10 to 200.

Preferably the metal-exchanged zeolite is a small pore zeolite, preferably having a CHA framework structure. Preferably the zeolite is exchanged with Cu and/or Mn. Preferably the zeolite is copper-promoted and has a CHA framework. Preferably the copper is present in an amount of from 0.1 to 5 wt % and most preferably from 2 to 4 wt %, by weight of the copper-promoted zeolite.

The second catalytic layer is provided in or on the walls of the inlet channels, extending from the inlet-end of the substrate, and comprises a PGM-containing composition. That is, the second catalytic layer, like the first catalytic layer, extends from the inlet-end.

In use, the second catalytic layer will be the second catalytic element of the article contacted by the exhaust gas to be treated. This is achieved by either having the second catalytic layer provided on the walls of the inlet channel and the first catalytic layer being provided on the second catalytic layer, or having the second catalytic layer provided in the walls of the inlet channels and the first catalytic layer being provided on the walls of the inlet channels.

The provision of a coating either "in wall" or "on wall" is well known in the art. It is achieved by careful tuning of the washcoat formulations to match the porosity of the filter walls. Thus, a "thinner" composition with finer material (especially the supported PGMs) can be infiltrated more readily into the walls than a "thicker" composition containing more coarse material. Exemplary in-wall and on-wall coatings are provided in the examples. By adapting the washcoat material it is therefore possible to ensure that the coating is provided as-desired in the porous walls of the article.

The second catalytic layer comprises a PGM-containing composition. Suitable PGMs include Pd, Pt and Rh. Preferably the PGM-containing composition contains Pt, preferably as the only PGM. The PGMs are preferably provided on a support material. Suitable support materials are well known in the art. Preferably the PGM-containing composition comprises alumina as a support for the PGMs.

Preferably the second catalytic layer extends up to 100% of a longitudinal length of the substrate extending from the inlet-end to an outlet-end, preferably from 25 to 90%, more preferably 35 to 80%, more preferably 40 to 70% and most preferably from 45 to 65% of the longitudinal length. As for the first catalytic layer, a preferred coating of up to 90% of the length will leave a portion of the walls at the end of the channel adjacent the plug without any coating thereon. Accordingly, the preferred coating of 40 to 70% of the length provides an inlet region of the inlet channels provided with the composition and a region distal from the inlet end which is free from the composition.

In use, the second catalytic layer will be the second catalytic element of the article contacted by the exhaust gas to be treated. It is preferred that the first catalytic layer is provided having at least the same length as the second catalytic layer and, preferably at least 5% to 10% longer (relative to the total length of the article). This ensures that the exhaust gas contacts the first catalytic layer before the second catalytic layer.

The third catalytic layer is provided in or on the walls of the outlet channels, extending from the outlet-end of the substrate, and comprises a second SCR composition. As noted above, the second SCR composition can be selected from the same materials as the first SCR composition. Preferably the second SCR composition is a copper-promoted CHA zeolite.

The third catalytic layer extends from the outlet-end of the substrate. Preferably the third catalytic layer extends up to 100% of a longitudinal length of the substrate extending from the outlet-end to the inlet-end, preferably from 20 to 90%, more preferably 30 to 80%, preferably 30 to 70% and most preferably from 40 to 60% of the longitudinal length. In embodiments where there is no overlap with the second catalytic layer, preferably the lengths are complimentary (i.e. the second layer is 40 to 70% and the third layer is 60 to 30%). In embodiments with overlap, the third layer may be longer, such as 60 to 90% of the length). Since the coating methods for applying such compositions typically involve dipping the substrate in a washcoat, a substantially 100% coating will extend fully along the inside of the outlet channel up to the plug blocking the inlet-end of the channel. A preferred coating of up to 90% of the length will leave a portion of the walls at the end of the channel adjacent the plug without any coating thereon. Accordingly, the most preferred coating of 70 to 90% of the length provides an outlet region of the outlet channels provided with the composition and a region distal from the outlet end which is free from the composition. In use, the third catalytic layer will be the last catalytic element of the article contacted by the exhaust gas to be treated.

When applying in-wall catalyst compositions the washcoat can be coated into all of the pores of the walls. Thus, if the second and third catalyst compositions are both provided in-wall, there can be substantial overlap in the location of the catalyst composition. Nonetheless, it is still possible to determine from which side the compositions have been applied. This is not least because the inlet channels will include the second composition right up to the mouth of the inlet, whereas the third composition cannot be coated so far, in view of the plug blocking the inlet-end of the outlet channel. Conversely, the outlet channels will include the third composition right up to the mouth of the outlet, whereas the second composition cannot be coated so far, in view of the plug blocking the outlet-end of the inlet channel. Thus, even when both the second and third compositions are provided in-wall, there will still be an SCR-only in-wall region right at the outlet of the out-let channels.

In a preferred embodiment, the third catalyst composition is provided on-wall. Preferably the second catalytic layer is provided in the walls of the inlet channels and the third catalytic layer is provided on the walls of the outlet channels. According to another preferred embodiment, the third catalyst composition is provided in-wall, with the second catalytic layer being provided in the walls of the inlet channels. In this instance there is close contact between the particles of the second and third catalyst layers if there is overlap. In some embodiments it is preferred that the second and third catalytic layers abut and do not overlap.

Preferably the composition forming the first and third layers are devoid of any PGM component. Preferably the composition forming the second layer is devoid of any SCR component. Nonetheless, it should be appreciated that when coating a porous wall-flow filter there may be a small amount of bleeding between the layers.

When describing washcoat loadings in a catalyst article, it is typical to provide PGM loadings in $g/ft^3$. This is an assessment of the metals per se in the applied layer. In contrast, washcoat loadings of SCR materials, which are typically much higher, are given in $g/in^3$. Unlike for PGMs, such values for the SCR materials typically includes all elements of the washcoat, including, for example, binders. Accordingly, the SCR composition herein includes both the zeolite components and any binders. Preferably the SCR compositions are therefore synonymous with the first and third catalytic layers.

In a conventional ASC (i.e. the PGM-containing end portion of a combined SCR/ASC) a ratio of the total loading of the PGMs in $g/ft^3$ to the total loading of SCR composition in $g/in^3$ is typically above 1:1 and more generally above 5:4. The inventors found that when they formulated an ASCF with the same loading of catalytic compositions there was undue $NO_x$ and $N_2O$ formation. Without wishing to be bound by theory, it was considered that the exhaust gases in the new configuration were being exposed to the PGM material to a far greater extent. That is, whereas in a flow-through ASC the exhaust gases only encounter the PGMs when they percolate through the layers of catalyst material, providing the ASCF configuration forces all of the exhaust gases directly through the PGM-containing composition.

The inventors therefore sought to address these concerns and arrived at an optimised relative loading of the catalyst material in the layers. A ratio of the PGMs in the second catalytic layer in g per $ft^3$ to the total amount of the first and second SCR compositions in the first and third catalytic layers in g per $in^3$ is from 1.5:8 to 5:8, preferably 2:8 to 4:8, preferably 4.5:16 to 7:16, preferably 4.5:16 to 6:16. Preferably the ratio of the PGMs in the second catalytic layer in g per $ft^3$ to the total amount of the first and second SCR compositions in the first and third catalytic layers in g per $in^3$ is about 5:16.

Given the underlying understanding of an ASC it is surprising that the structure can also operate in a three-layer configuration as disclosed herein. In particular, the SCR layer of a conventional ASC only functions because of amounts of ammonia trapped in the SCR layer in use. It is surprising that sufficient ammonia can percolate through the first and second layers to the third catalytic layer to then perform SCR of any $NO_x$ formed on contact of the exhaust gases with the PGMs of the second catalytic layer. Nonetheless, the performance demonstrates that this does occur, and comparative examples demonstrated that in the absence of the outlet-end SCR composition the exhaust had undesirably high levels of $NO_x$ and $N_2O$—presumably as a consequence of contacting the PGMs as the last layer before leaving the article.

Preferably a weight ratio of the catalytically active components in the first and third catalytic layers is from 2:3 to 3:2 and preferably is about 1:1. That is, preferably the first and third catalytic layers are provided in similar amounts. Indeed, it is especially preferred from a manufacturing position that the first and third catalytic layers also have substantially the same composition.

Preferably at least two of the first, second and third catalytic layers, and preferably all three, extend 70 to 90% of the longitudinal length. As will be appreciated, when all three extend to such a length there will be overlap between all three layers. In embodiments where all three layers extend to this range of lengths there is therefore a portion of the inlet channel walls which is not provided with the first or second catalytic layers (and of course neither the third catalytic layer) and a portion of the outlet channel walls which is not provided with the third catalytic layer (and of course neither the first nor second catalytic layer). This configuration facilitates the layer formation, avoiding the build-up at the plugged ends that might arise when attempting full channel coating, but also helps to ensure that the gases to be treated first contact the first catalytic layer and the last contact the third catalytic layer.

In embodiments where the second and third catalytic layers do not overlap, preferably the first catalytic layer extends 70 to 90% of the longitudinal length, the second catalytic layer extends 30 to 60% of the longitudinal length and the third catalytic layer extends 70 to 40% of the longitudinal length.

The SCR and PGM-containing compositions may comprise additional components. For example, components such as fillers, binders, stabilizers, rheology modifiers, and other additives. In certain embodiments, the washcoat comprises pore-forming agents such as graphite, cellulose, starch, polyacrylate, and polyethylene, and the like. These additional components do not necessarily catalyse the desired reaction, but instead improve the catalytic material's effectiveness, for example by increasing its operating temperature range, increasing contact surface area of the catalyst, increasing adherence of the catalyst to a substrate and the like. Typically, the only additional component will be a binder. Preferably the additional components form less than 25 wt %, preferably less than 15 wt %, and most preferably less than 10 wt % of the layers with the balance the SCR or supported PGMs, respectively. The particle size of the binder particles will vary depending on whether the associated coating is in-wall or on-wall. Typical alumina binders for in-wall applications will have a D90 of less than 7 μm as measured by laser diffractometry.

Techniques for applying the first and second layers are well known in the art and include the application of a washcoat to the surfaces to be coated. After coating the layers onto the article, they are typically calcined to fix the layers. Calcining is well known in the art and may be carried out in air at temperatures of about 500° C.

The inventors envisioned two approaches for forming the catalyst article. According to an aspect there is provided a method for the manufacture of the catalyst article in the following steps, in order: applying a washcoat to the outlet channels to form the third coating and then calcining; applying a washcoat to the inlet channels to form the second coating and then calcining; applying a washcoat to the inlet channels to form the first coating and then calcining. In each calcining step there will generally be a preceding drying step.

According to a more preferred embodiment, since it involves less calcining, there is provided a method for the manufacture of the catalyst article in the following steps, in order: applying a washcoat to the inlet channels to form the second coating and then calcining; applying a washcoat to the outlet channels to form the third coating and then drying; applying a washcoat to the inlet channels to form the first coating and then calcining. In each calcining step there will generally be a preceding drying step. Avoiding a calcination step reduces the energy cost and the process costs.

Preferably the catalyst article comprises means for electrically heating the catalyst article. Such means are well known in the art and generally rely on resistive heating to raise the operating temperature of a catalyst article in-use. This approach may be used for in situ regeneration of the catalyst article to remove built up particulate deposits, although there are associated energy costs for achieving the temperatures required. Other approaches to regeneration are known, such as raising the temperature of the exhaust gases through engine management or hydrocarbon dosing.

According to a further aspect there is provided an exhaust-gas treatment system comprising the catalyst article described herein. Thus, the system implicitly comprises an initial manifold for receiving exhaust gases, such as from an engine, and an outlet for emissions of treated exhaust gases to the environment. In use, the catalyst article is able to treat any ammonia slipped from upstream components to produce $N_2$, without forming and releasing excess $NO_x$ or unduly producing $N_2O$.

Preferably the exhaust-gas treatment system comprises in order, a catalysed soot filter (CSF) or diesel particulate filter (DPF), means for injecting a nitrogenous reductant, an SCR catalyst article and the catalyst article described herein. Preferably the system further comprises a Diesel Oxidation Catalyst (DOC) upstream of the CSF. All of these components and their formulations and composition are well known in the art. The upstream means for injecting a nitrogenous reductant and SCR catalyst article are the cause of both the potentially slipped ammonia (hence the ASCF) as well as the formation of reductant-derived particulate matter. Since this reductant-derived particulate matter is produced downstream of the CSF (or DPF) there is no other filter body on which it would be retained.

The provision of a CSF upstream of the catalyst article (ASCF) prevents the build-up of soot on the ASCF. This is desirable because it is difficult to handle a large build-up of material in an end-of-system component due to the relatively lower temperatures. This makes it more energy intensive to raise the temperature of the ASCF as would be required were it to have soot build up. In contrast the build-up of urea/ammonia derived particles is relatively low, such that regeneration can be performed rarely, as necessary.

The nitrogenous reductant provided by the means for injecting a nitrogenous reductant can be ammonia per se, hydrazine or an ammonia precursor selected from the group consisting of urea ($(NH_2)_2CO$), ammonium carbonate, ammonium carbamate, ammonium hydrogen carbonate and ammonium formate. Ammonia and urea are most preferred alternatives. Preferably the means for injecting a nitrogenous reductant further comprises a reservoir comprising urea.

Preferably the catalyst article is, in use, the last catalyst article encountered by exhaust gas before being emitted to the atmosphere. This means that the article can suitably work as an ammonia slip catalyst and simultaneously prevent the release of urea/ammonia-derived particulate matter to the atmosphere.

According to a further aspect there is a provided a fuel combustion and exhaust treatment system comprising an engine and the exhaust-gas treatment system described herein. Preferably the engine is a diesel or lean-burn engine.

According to a further aspect there is provided a vehicle comprising the fuel combustion and exhaust treatment system described herein, preferably wherein at least the catalyst article described herein is located in an underfloor location and/or encounters, in normal use, exhaust gases at a temperature of from 200 to 450° C., preferably 270 to 350° C. The provision of the catalyst article in an underfloor location occurs because the article is preferably at the end of the exhaust system. This gives rises to challenges where the temperature facilitates the formation of the reductant-derived particulate matter but not its destruction, and hence the ASCF is a solution to meeting emissions standards.

According to a further aspect there is provided a method for the treatment of an exhaust gas, the method comprising passing an exhaust gas through the catalyst article described herein, or the exhaust-gas treatment system described herein.

The invention will now be described further in the following figures. In which.

Figure 7A:
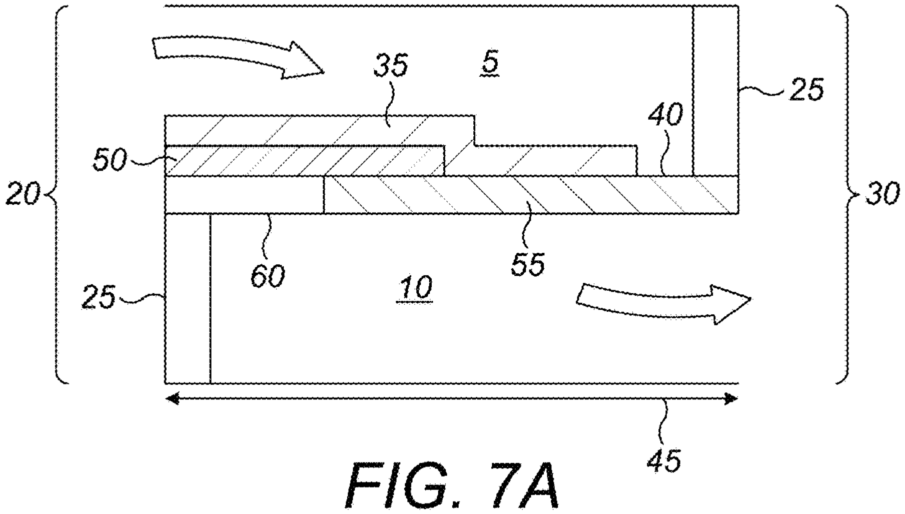
Figure 7B:
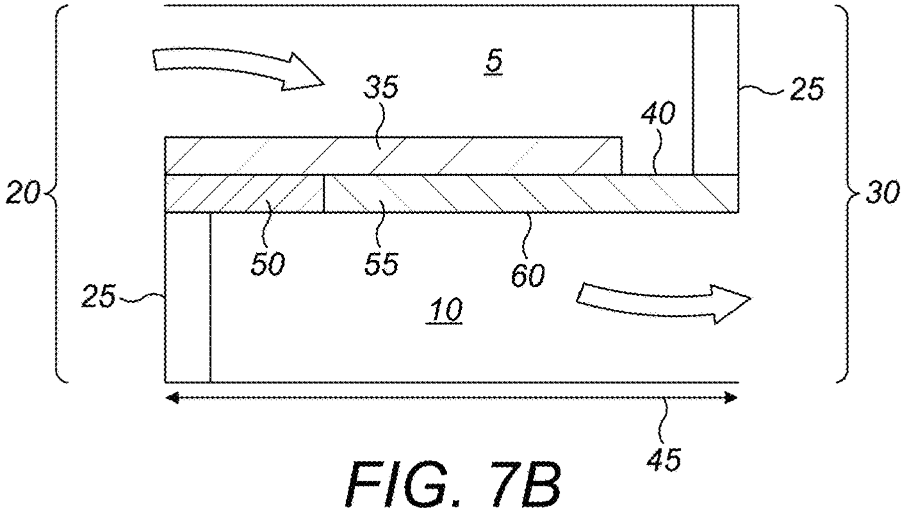
Figure 7C:
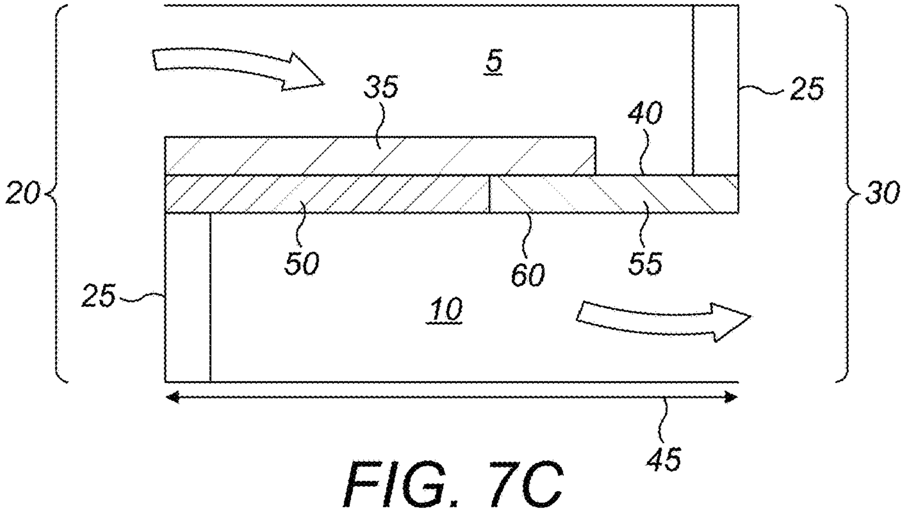

FIGS. 7A-C show three preferred embodiments of the present invention.

Figure 8:
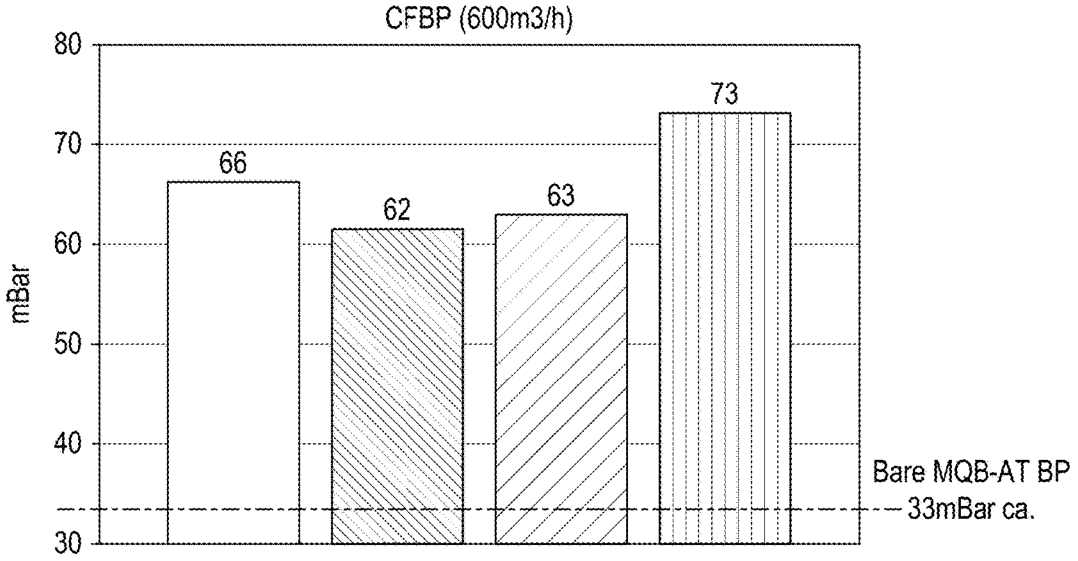
Figure 9:
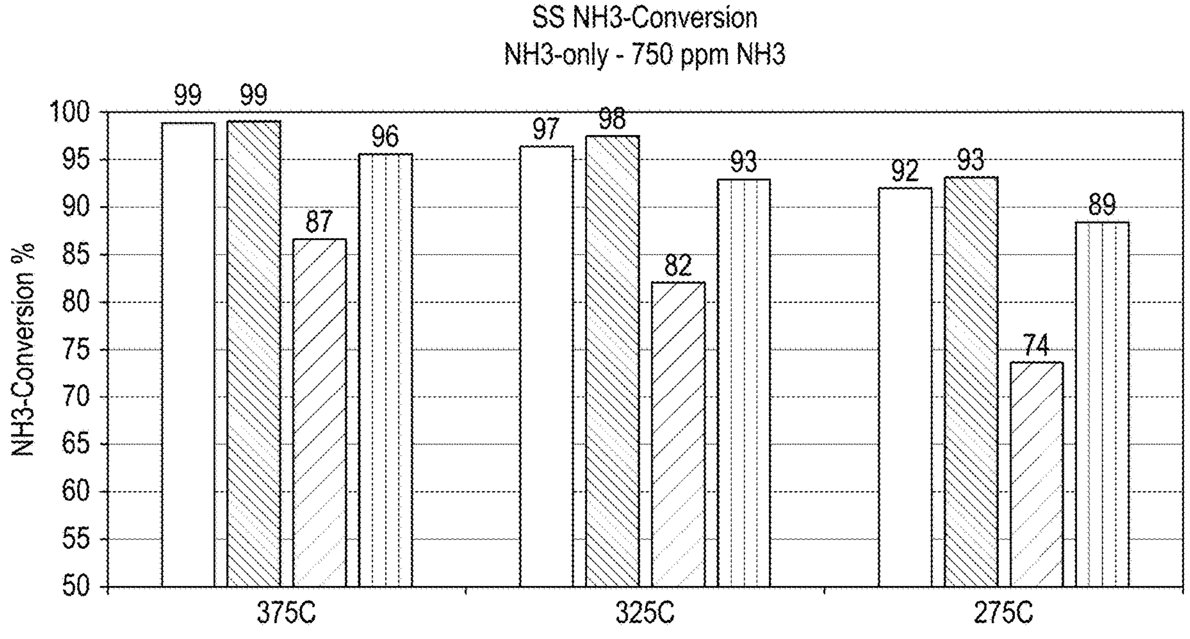
Figure 10:
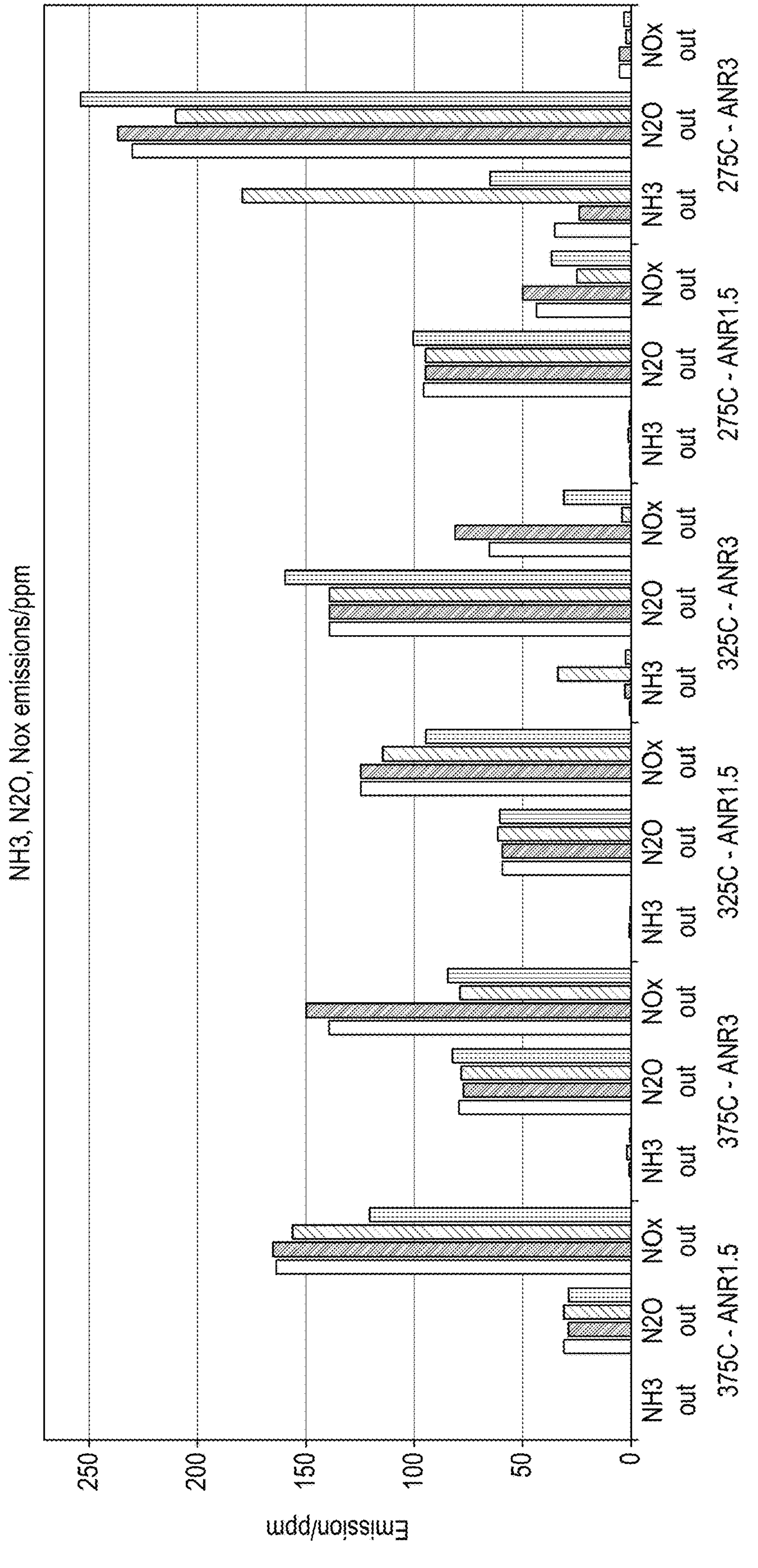

FIGS. 8-10 show testing data when comparing the embodiments of FIGS. 7A-C against a standard.

Figure 1:
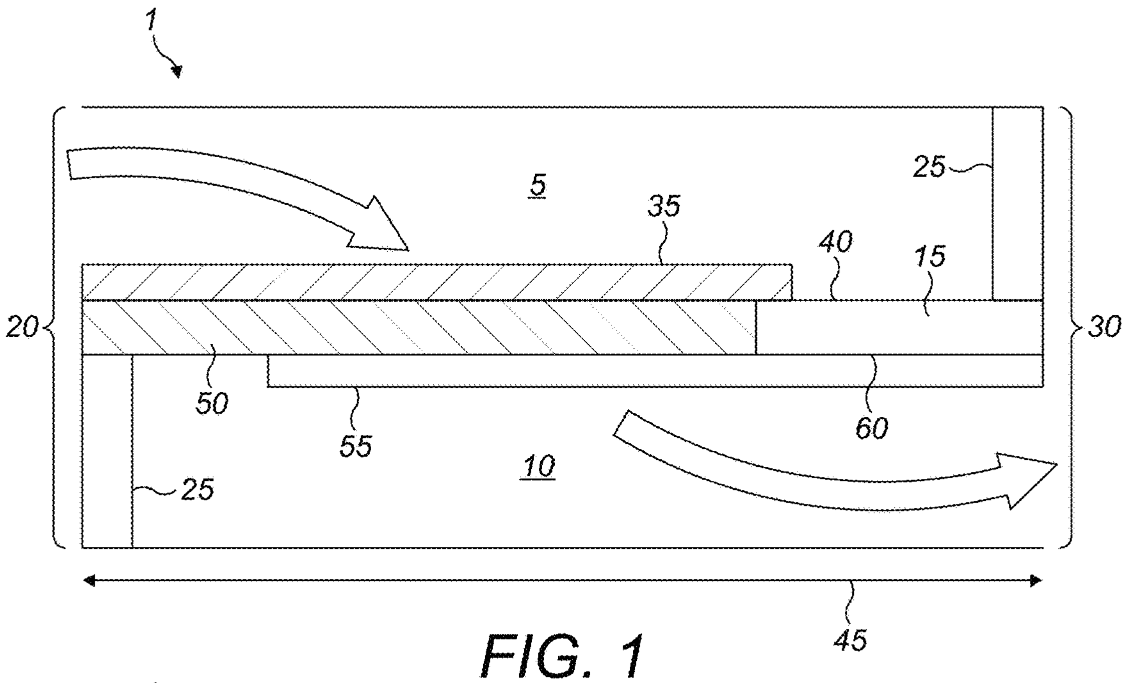
FIG. 1 shows a diagrammatic cross-section of a portion of a catalyst article described herein.

FIG. 1 shows a diagrammatic portion of a catalyst article 1 as described herein. In particular, the portion shown focuses on a single inlet channel 5 and a corresponding single outlet channel 10. The inlet channel 5 is separated from the outlet channel 10 by a porous wall 15. The inlet channel 5 is open at an inlet face 20 of the catalyst article 1 and blocked with a plug 25 at an outlet face 30 of the catalyst article 1. The outlet channel 10 is open at the outlet face 30 of the catalyst article 1 and blocked with a plug 25 at an inlet face 20 of the catalyst article 1.

There is provided a first catalytic layer 35 on a first wall surface 40 on the inlet channel 5. The first catalytic layer 35 is provided as a washcoat and comprises an SCR composition such as a Cu-CHA washcoat composition, together with conventional binders and processing aids. The first catalytic layer 35 extends from the inlet face 20 at least 70% of a total length 45 of the catalyst article 1.

There is provided a second catalytic layer 50 in the porous wall 15. The second catalytic layer 50 is provided as a washcoat and comprises a PGM-containing composition such Pt supported on alumina, together with conventional binders and processing aids. The second catalytic layer 50 extends from the inlet face 20 at least 70% of a total length 45 of the catalyst article 1. The second catalytic layer 50 is preferably a little shorter than the first catalytic layer 35.

There is provided a third catalytic layer 55 on a second wall surface 60 on the outlet channel 10. The third catalytic layer 55 is provided as a washcoat and comprises an SCR composition such as a Cu-CHA washcoat composition, together with conventional binders and processing aids. The third catalytic layer 55 extends from the outlet face 30 at least 70% of a total length 45 of the catalyst article 1.

In use, exhaust gases entering the catalyst article 1 through the inlet face 20 pass into the inlet channel 5, through the porous wall 15, into the outlet channel 10 and out of the article 1. This route is shown by the large arrows. The gases pass through the first, second and third catalytic layers (35, 50, 55) in order. Ammonia is stored on the first and third catalytic layers (35, 55) until it can be used to perform an SCR reaction to decompose $NO_x$ produced on the second catalytic layer 50. Particulate matter from the ammonia/urea accumulates in the inlet channel 5 rather than being released to the atmosphere. The particulate matter can be combusted, if necessary, to reduce undue build-up and this can be assisted, if necessary, but localised resistive heating using an electrical element (not shown).

Figure 2:
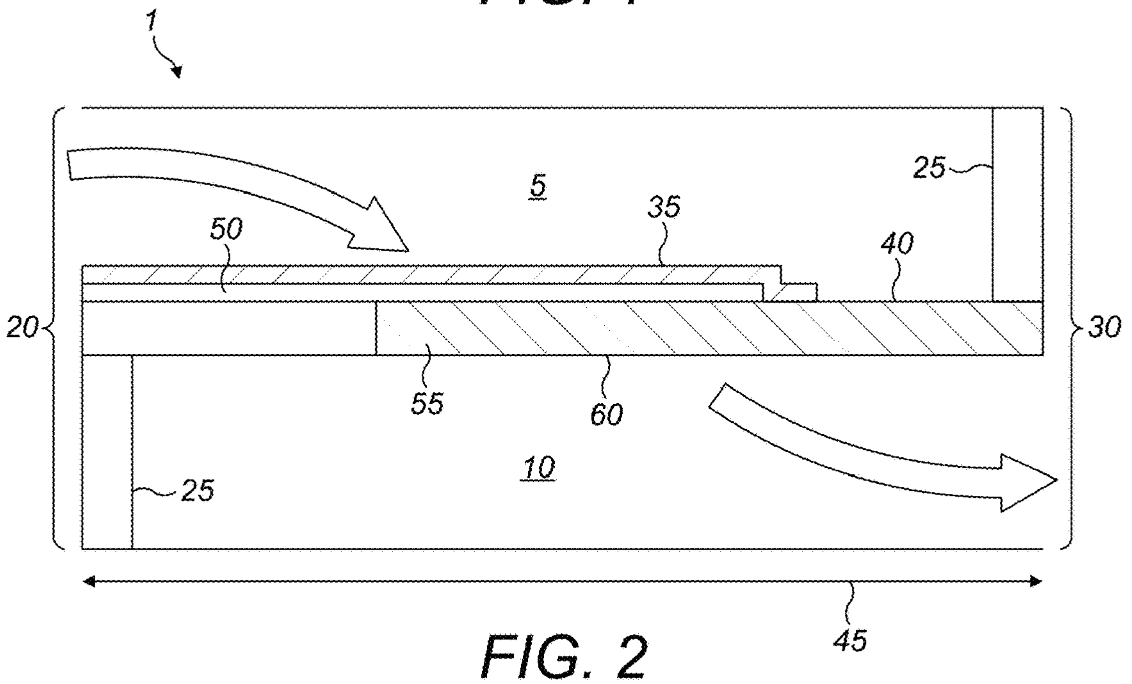
FIG. 2 shows a diagrammatic cross-section of a portion of a catalyst article described herein.

FIG. 2 shows an alternative configuration of the first, second and third catalytic layers (35, 50, 55) in the catalyst article 1. All reference numerals refer to the same components and all of the compositional details remain the same.

The second catalytic layer 50 is provided on the wall 40 of the inlet channel 5. The first catalytic layer 35 is provided on the second catalytic layer 50 and, since it is a little longer, provided overlapping a small portion of the wall 40 of the inlet channel 5. The third catalytic layer 55 is provided in the porous wall 10, although it could instead be provided on the surface 60 of the outlet channel 10.

Figure 3:
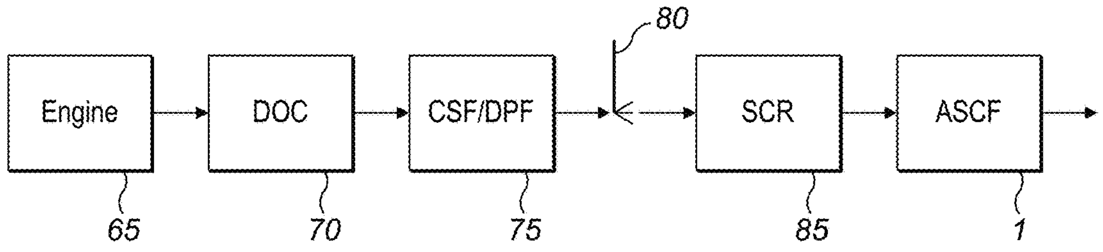
FIG. 3 shows a configuration of components of an exhaust-gas treatment system downstream of an engine.

FIG. 3 shows an exhaust gas treatment system comprising, downstream of an engine 65, a diesel oxidation catalyst (DOC) 70, then a catalysed soot filer (CSF) 75, then a means for the injection of a nitrogenous reductant 80, then an SCR 85 and finally a catalyst article 1 as described herein, i.e., an ASCF. The CSF 75 can be a diesel particulate filter (DPF). It is desirable that there is a CSF 75 or DPF upstream of the catalyst article 1, since it is difficult to regenerate such a component and the build-up of soot on the catalyst article 1 (prevented by the CSF 75 or DPF) would lead to unacceptable back-pressures. The difficulty in regenerating the catalyst article 1 were soot to build up is exacerbated by the end-of-system location (such as underfloor) where the lower temperatures do not suffice.

Examples

The invention will now be described further in relation to the following non-limiting examples.

Exemplary catalyst articles were produced and tested as explained below.

Engine Testing

The inventive examples used a wall-flow filter substrate of 10.5"×6.0". A reference filter was used which was 10.5"×4.0" but coated with the same total mass (g) of washcoat as on the coated filter (varied on the filter as discussed below).

SCR "In-Wall" Coating—"Coating 1":

A slurry of spray-dried Cu(3.3 wt %) Chabazite (SAR 20) was milled to target particle size distribution characterised by D90=3.8-3.9 μm and stirred overnight. The milled slurry was adjusted to target pH 9.9-10.2 by addition of tetraethylammonium hydroxide aqueous solution and stirred for 5 minutes. Finally, a low particle size mixed oxide containing $Al_2O_3$ (91.2 wt %)/$La_2O_3$ (4.8 wt %)/$Nd_2O_3$ (4.1 wt %), with particle size distribution characterised by D90=3.0-5.0 μm, was added under high-speed stirring to target 11 wt % with respect to CuChabazite calcined weight. The washcoat with the composition above was stirred overnight, then re-adjusted to pH 9.9-10.2 by addition of tetraethylammonium hydroxide aqueous solution. The pH-adjusted washcoat was stirred for 30 minutes and coated from the rear end of a suitable DPF, to a target washcoat loading of 0.8 g/in$^3$ with reference to the volume of the ASCF brick.

The block was dried at 110° C. for 30 minutes and calcined at 500° C. for 2 hours.

PGM In-Wall Coating—"Coating 2":

Succinic acid was dissolved in demineralised water to target 40 g/ft$^3$ and the solution was stirred for 5 minutes. To this solution, platinum(IV)nitrate was added slowly to target 0.5 g/ft$^3$ of platinum, and the mixture was stirred for 5 minutes. Finally, low particle size alumina P0 (previously milled to target particle size distribution characterised by D90=4.8-5.0 μm) was added as a slurry, to target 0.06 g/in$^3$. The washcoat with the composition above was stirred for 3 h and coated from the front end of the mid-processed DPF containing the calcined SCR "Coating 1" (described above), then dried at 115° C. for 30 minutes and calcined at 500° C. for 2 hours.

All the targets above refer to final loadings with reference to the volume of the ASCF brick.

SCR Porous On-Wall Coating—"Coating 3":

A slurry of spray dried Cu(3.3 wt %) Chabazite (SAR 20) was milled to target particle size distribution characterised by D90=3.8-3.9 μm and stirred overnight. The slurry was transferred in a chiller tank, and colloidal aluminium oxide hydroxide (boehmite) was added under high-speed stirring to target 18 wt % with respect to CuChabazite calcined weight. The mixture was stirred for 30 minutes, then a cellulose pore former (Arbocel UFC100) was added under high-speed stirring to target 54 wt % with respect to CuChabazite calcined weight. The mixture was stirred for 30 minutes, then a cellulose thickener was added under high-speed stirring to target 0.2 wt % with respect to full weight of the wet washcoat. The mixture was stirred for 30 minutes at high speed, then the washcoat was stored in a sealed container for 2 days. The washcoat was then stirred for 3 minutes at high speed, and coated from the front end of the mid-processed DPF containing the calcined SCR "Coating 1" and the calcined PGM "Coating 2" (described above), to a target washcoat loading of 0.8 g/in$^3$ with reference to the volume of the finished catalyst. The brick was dried at 110° C. for 45 minutes and then calcined at 500° C. for 2 hours.

SCAT Testing

Testing was performed with SCAT-testing. This type of testing does not include any other catalysts upstream or downstream, but artificially provides the core with a gas composition that is representative of specific operation conditions—namely 350 ppm CO/500 ppm $NH_3$/0 ppm $NO_x$ for "$NH_3$-rich conditions", or 350 ppm CO/500 ppm $NH_3$/500 ppm NO for "$NO_x$-biased" conditions.

All the examples used a wall-flow filter substrate of 1"×5.53". The space velocity was the same in all tests.

Example ASCFs were manufactured having an on-wall SCR washcoat in the inlet channels (0.8 g/in$^3$); a PGM-containing in-wall composition applied from the inlet side (Pt on alumina with varying loadings); and an in-wall SCR washcoat in the outlet channel (0.8 g/in$^3$). A comparative flow-through filter was provided with an overlying SCR layer (2.4 g/in$^3$) and an underlying PGM-containing layer with 3 g/ft$^3$ of Pt. The PGM coating was applied to the rear 50% of the brick.

The PGM levels were 1 g/ft$^3$, 0.75 g/ft$^3$, 0.5 g/ft$^3$ and 0.25 g/ft$^3$. This gives ratios with the SCR material (1.6 g/in$^3$) as discussed herein of 10:16, 7.5:16, 5:16 and 2.5:16. The SCR material here is the copper exchanged zeolite and binder of the washcoat layers. These compare with a standard ASC which had in the examples a ratio of 30:24. This is representative of a conventional configuration.

In further SCAT testing the results show that $NH_3$ conversion was comparable for Pt 1 g/ft$^3$, 0.75 g/ft$^3$, 0.5 g/ft$^3$, but much worse for 0.25 g/ft$^3$. $N_2O$ production was substantially the same for Pt 0.5 g/ft$^3$ as on the standard flow-through, but much worse for those examples with higher Pt loading.

The ASCF catalysts showed improved filtration efficiency in preliminary measurements when compared with a std-ASC on FT. In particular, PN10 emissions were 70-90% lower when using an ASCF catalyst in place of a std-ASC on FT.

The values around Pt 0.5 g/ft$^3$ (paired with SCR of 1.6 g/in$^3$) therefore provides a sweet-spot where the oxidation performance matches the SCR performance—the $NH_3$ conversion is sufficient without undue $N_2O$ make and at the same time the filtration performance addresses the reductant-derived particulate matter. This is observed ideally at and around a ratio of 5:16.

Figure 4:
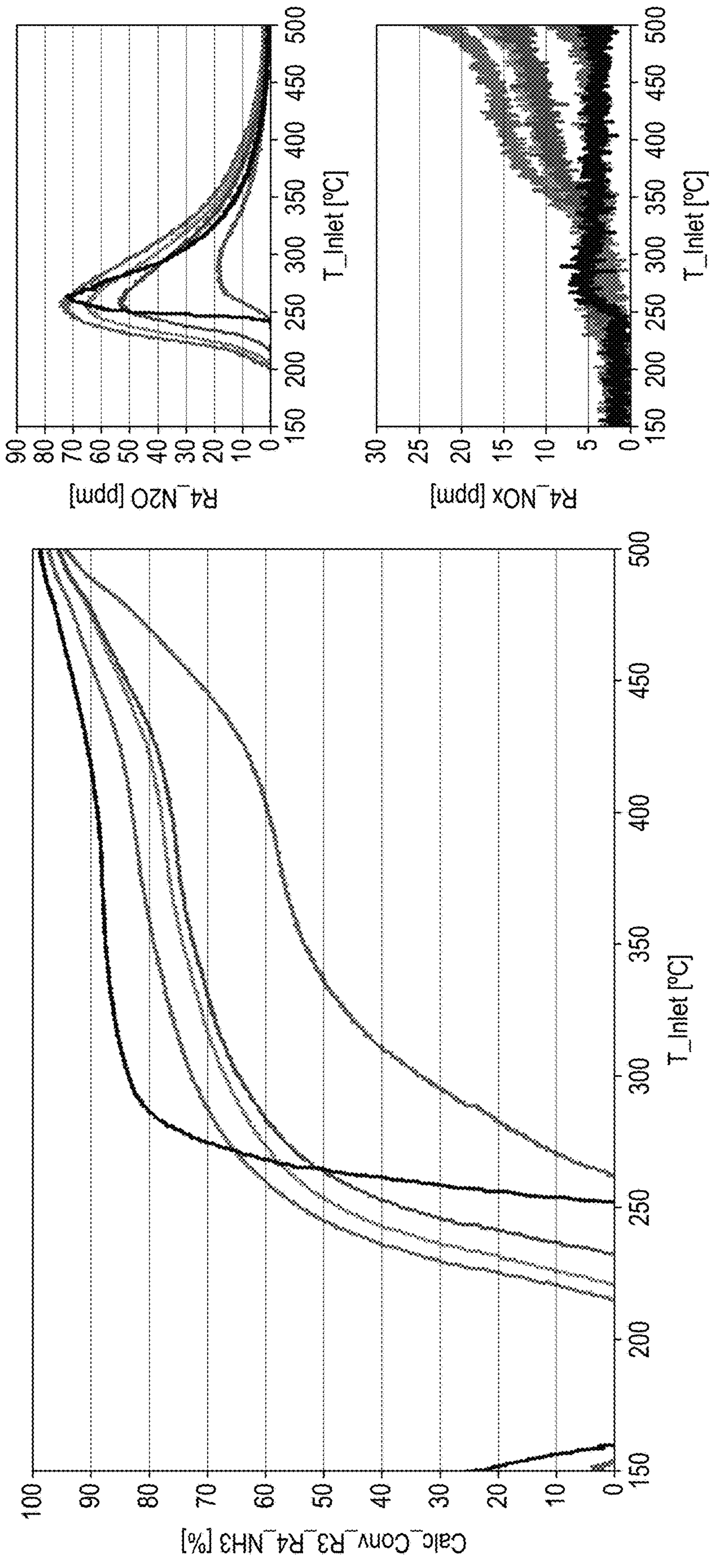
FIG. 4 shows charts of $NH_3$ conversion, $N_2O$ and NOx production for a comparative flow-through ASC against ASCF with different ratios of PGM to SCR loading ($NH_3$-only—500 ppm SCAT SV=90 k).
Figure 5:
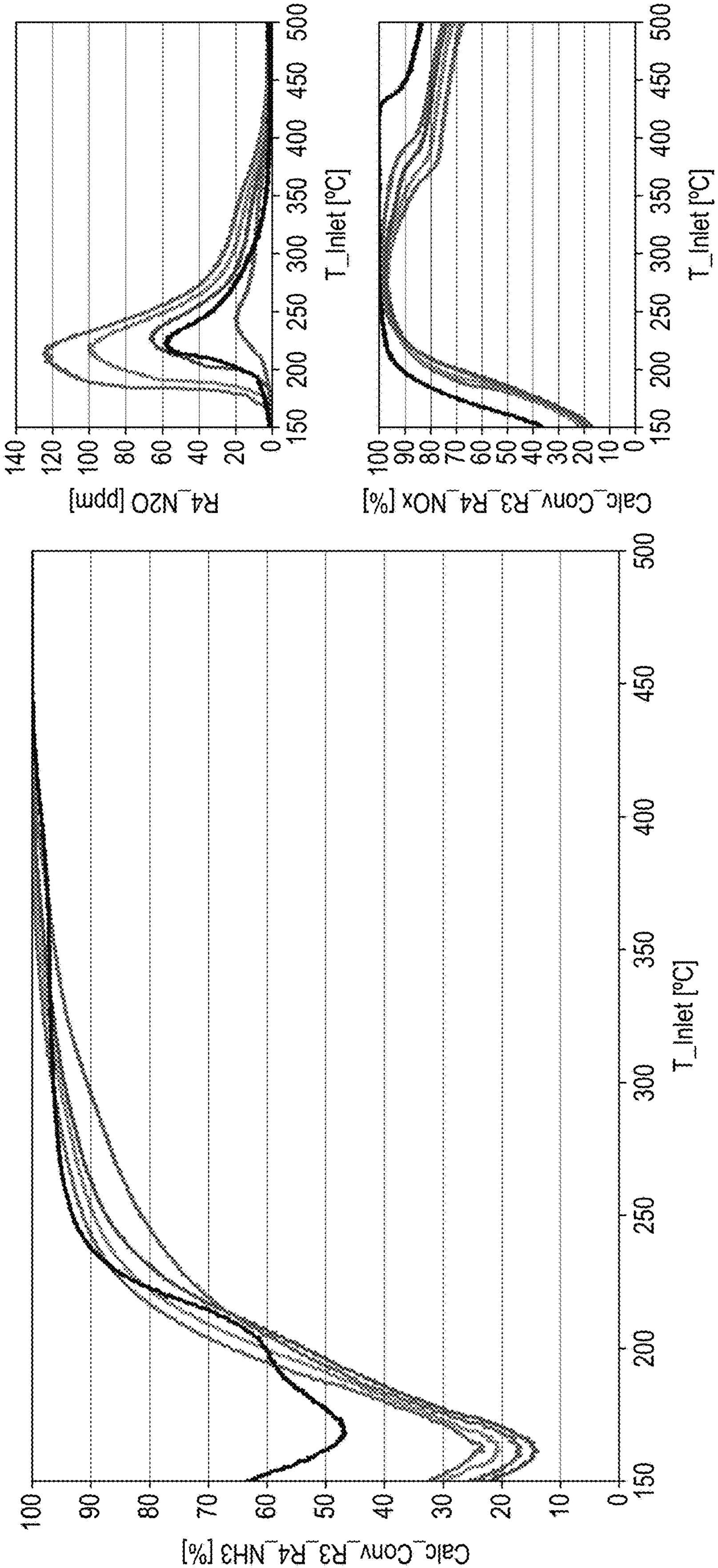
FIG. 5 shows charts of $NH_3$ conversion, $N_2O$ and NOx production for a comparative flow-through ASC against ASCF with different ratios of PGM to SCR loading (NOx-biased: 500 ppm $NH_3$ and 500 ppm NO, SCAT SV=90 k).

In FIG. 4, for $NH_3$ conversion, the lines at 300° C., in order from top to bottom: the Std, 1, 0.75, 0.5 and 0.25 g/ft$^3$. For $N_2O$ production, the lines peak in order from top to bottom: 1, the STD, 0.75, 0.5, and 0.25 g/ft$^3$. For NOx production, the lines at 400° C. in order from top to bottom: 1 g, 0.75 g, 0.5 g, 0.25 g, and STD.

As shown in these examples, a three-layer ASCF has been developed with the aim of translating the ASC-concept from flow through to filter substrates. The three-layer ASCF approach broadens the variety of feasible coating designs, when compared with a standard two-layer ASC, while also reducing the emission of particulate matter significantly. In particular, the use of a three-layer ASCF can exploit different combinations of in-wall and on-wall coatings, thus allowing for a fine control of ASC activity, backpressure and filtration efficiency.

Subsequent testing was performed using engine testing data to show that the same benefits can be achieved under genuine use conditions. In this case, either the ASCFs or the SCR/ASC bricks are downstream to another SCR flow-through brick (VSCR, in this case). Further information is shown in FIG. 6. Here a standard ASCF is coated with the same mass (grammes) of SCR- and PGM-catalysts as the standard flow-through SCR/ASC, while the "lower PGM"-variant has just half the PGM amount but the same SCR washcoat amount. The steady state (SS) engine testing data was performed at three different temperatures (270, 320, 370

C), where the low-PGM variant is much better for secondary emissions, while still being comparable with the SCR/ASC reference in terms of $NH_3$-conversion—this gives a better trade-off between $NH_3$-conversion and secondary emissions for the low-PGM variant.

In each cluster of results, the left-hand column is a conventional SCR/ASC, the middle column is an ASCF provided with comparable levels of SCR and PGMs to the conventional SCR/ASC and the right-hand column has half the level of PGMs as the middle column (0.5 g/ft$^3$ of PGMs and 1.6 g/in$^3$ of SCR total).

Figure 6A:
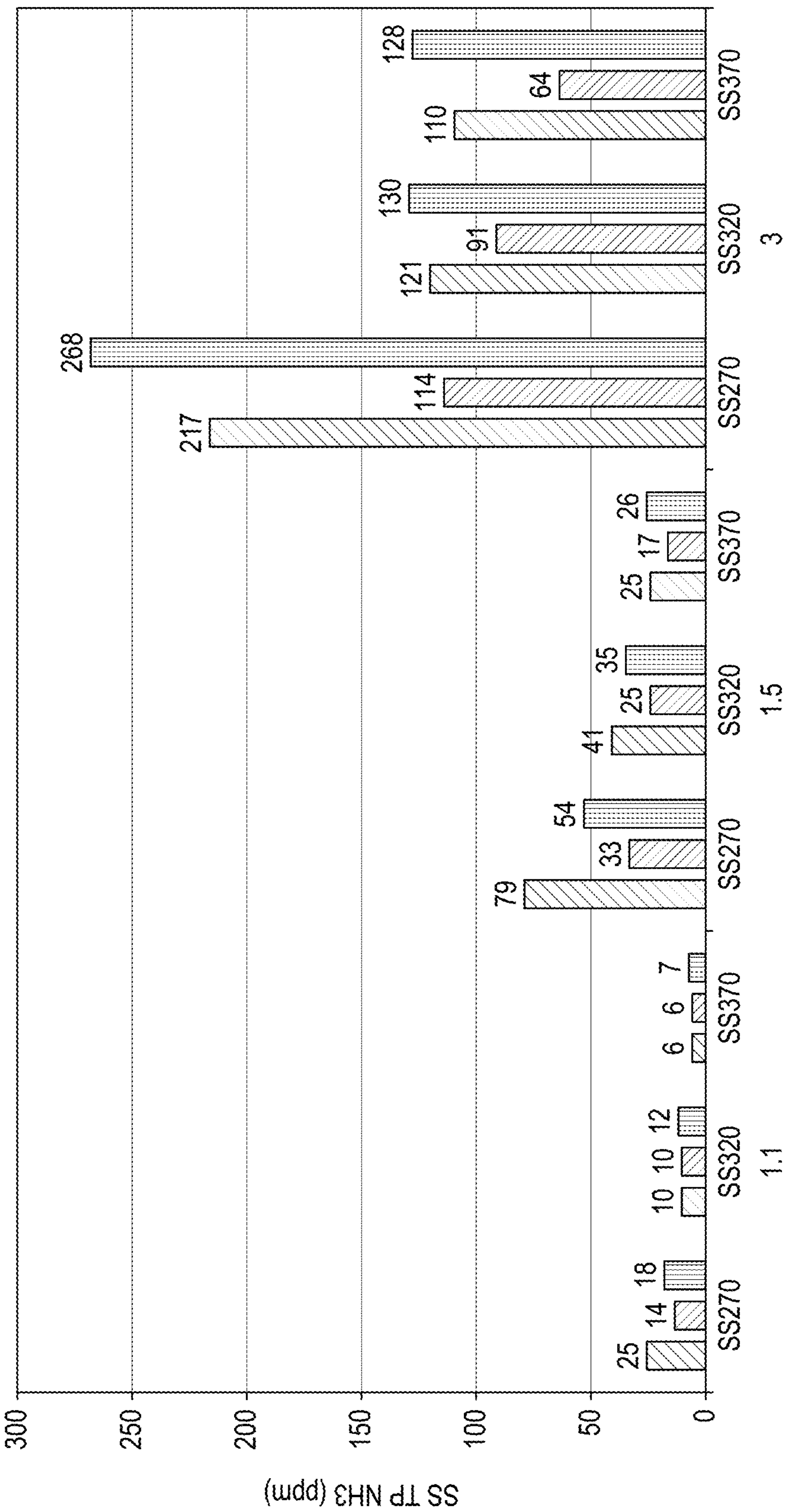
FIGS. 6A, 6B and 6C show engine testing data as discussed below.
Figure 6B:
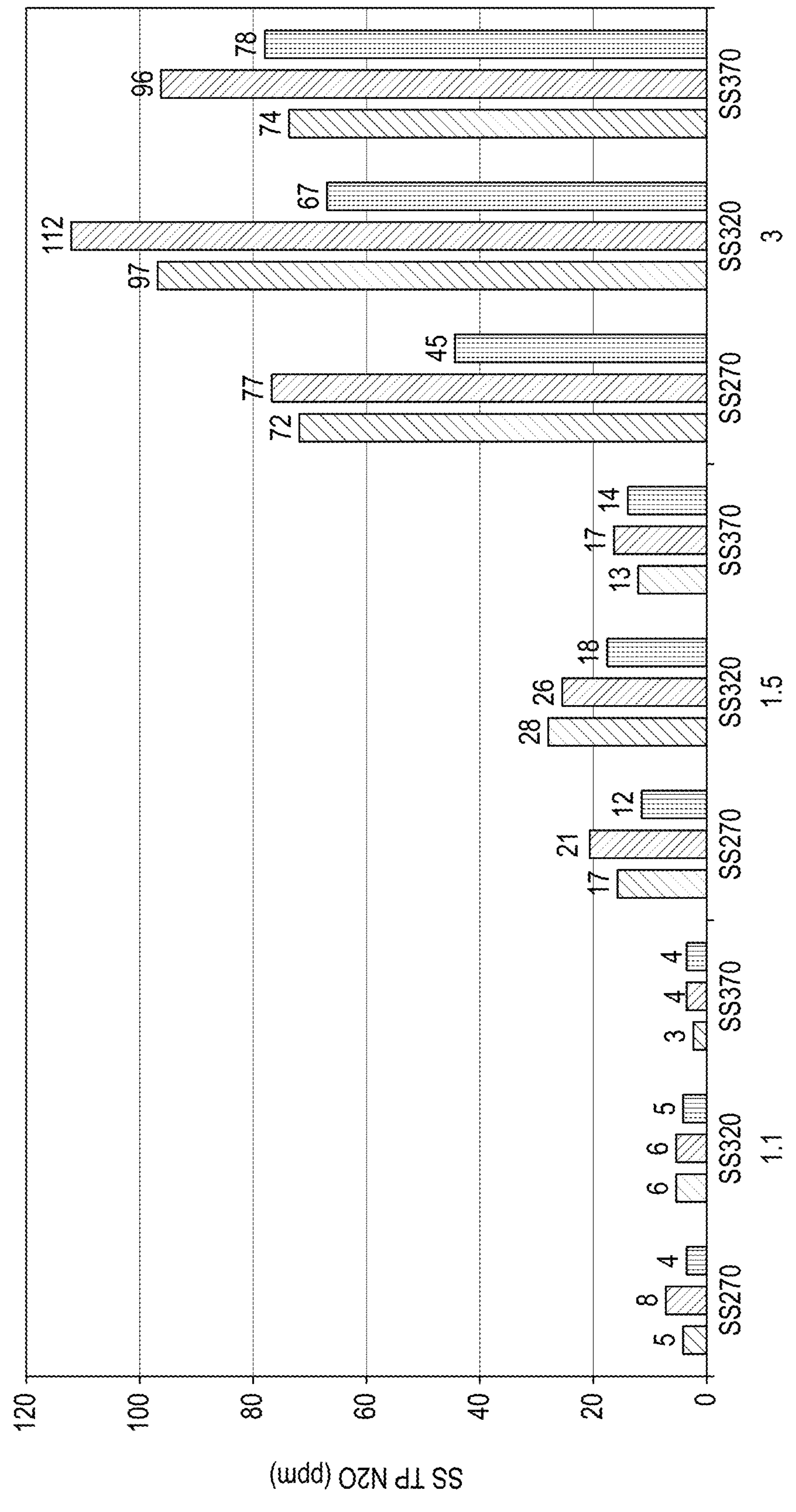
Figure 6C:
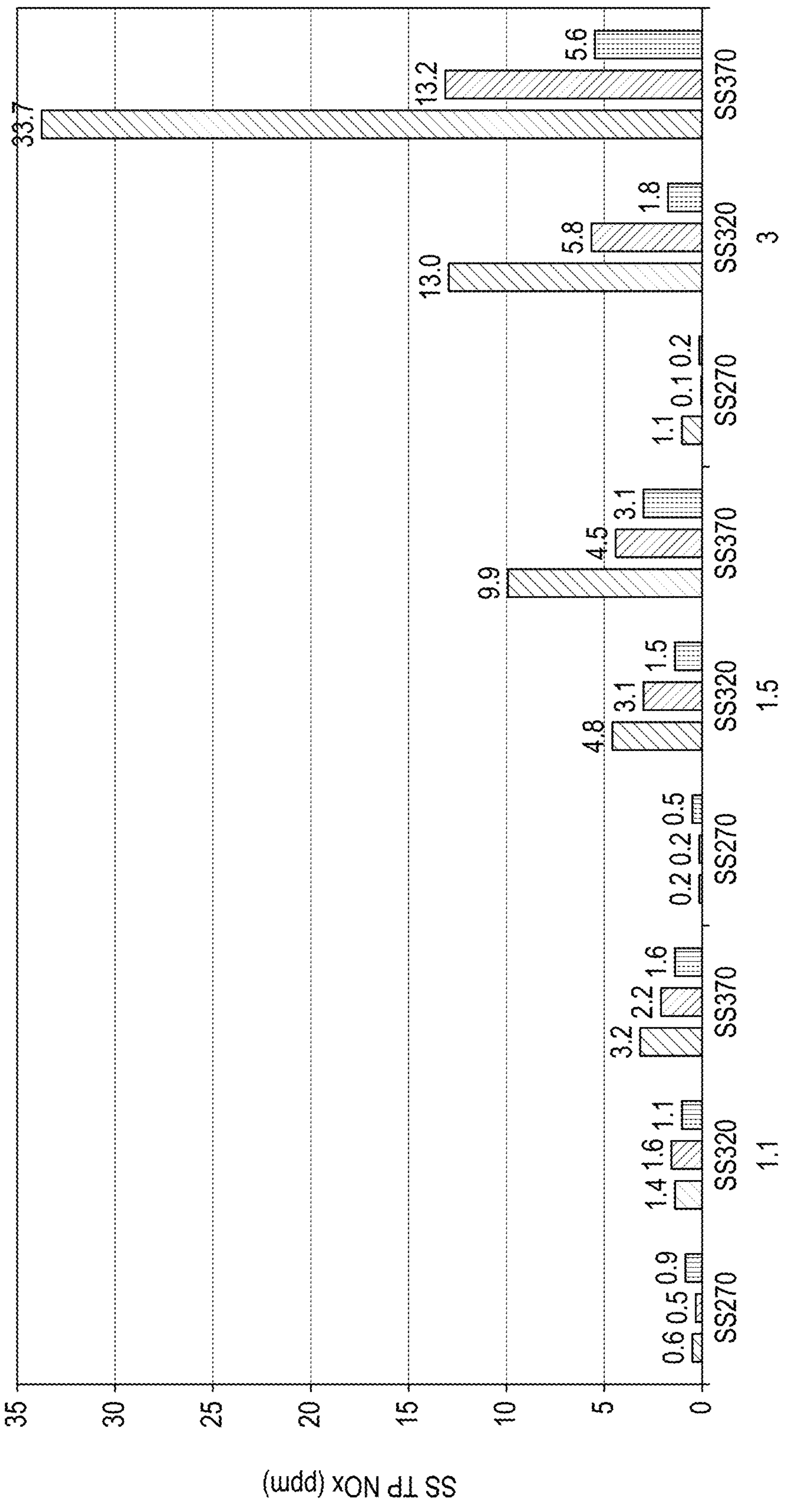

FIG. 6A shows that the inventive ASCF achieves sufficiently good $NH_3$ slip control. FIG. 6B demonstrates an improvement in reduced $N_2O$ production levels. FIG. 6C demonstrates an improvement in reduced $NO_x$ production levels. The SS numbers in each chart reflect the testing temperature under steady state.

FIGS. 7A-7C use the same reference numerals as FIGS. 1 and 2 for the same component parts.

FIG. 7A resembles FIG. 2, but this is an embodiment where the second catalytic layer 50 has a shorter length, extending about 50% of the total length 45 of the catalyst article 1. The first catalytic layer extends about 80% of the total length 45 of the catalyst article 1. Coating the PGM layer as a porous coating on-wall in 7A was an attempt to prevent/minimise close contact with the SCR catalyst particles (which are dispersed within the wall volume and then fundamentally segregated from the PGM on-wall)

FIGS. 7B and 7C are embodiments where the second catalytic layer 50 does not overlap the third catalytic layer 55. Both of these layers (50,55) are provided as in-wall washcoats and together coat the total length 45 of the catalyst article 1. In FIG. 7B the second catalytic layer 50 is about 25% of the total length 45 and the third catalytic layer 55 is about 75% of the total length 45. In FIG. 7C the second catalytic layer 50 is about 50% of the total length 45 and the third catalytic layer 55 is about 50% of the total length 45.

As supported in the embodiments 7B and 7C, avoiding overlap between these layers avoids close contact between the platinum group metals and the SCR catalysts.

FIG. 8 shows a comparison of the embodiments 7A-7C against a comparative in which the second catalytic layer 50 is about 70% of the total length 45 (in-wall) and the third catalytic layer 55 is about 80% of the total length 45 (in-wall). The provision of these overlapping in-wall coating means that there is overlap in the wall of the platinum group metals and the SCR catalyst. The columns from left to right are: comparative, 7C, 7B and 7A respectively. FIG. 8 shows that the lowest back pressure is obtained for the embodiment of FIGS. 7C (62) and 7B (63).

FIG. 9 shows $NH_3$ conversion at different temperatures. Performance is consistently highest for the embodiment of FIG. 7C. The embodiment of FIG. 7B has the worst performance. The columns from left to right are: comparative, 7C, 7B and 7A respectively.

FIG. 10 shows $NH_3$, $N_2O$ and NOx output at different temperatures and ANR ratios. The columns from left to right at each set of conditions are: comparative, 7C, 7B and 7A respectively.

The term "comprising" as used herein can be exchanged for the definitions "consisting essentially of" or "consisting of". The term "comprising" is intended to mean that the named elements are essential, but other elements may be added and still form a construct within the scope of the claim. The term "consisting essentially of" limits the scope of a claim to the specified materials or steps and those that do not materially affect the basic and novel characteristic(s) of the claimed invention. The term "consisting of" closes the claim to the inclusion of materials other than those recited except for impurities ordinarily associated therewith.

The foregoing detailed description has been provided by way of explanation and illustration and is not intended to limit the scope of the appended claims. Many variations in the presently preferred embodiments illustrated herein will be apparent to one of ordinary skill in the art and remain within the scope of the appended claims and their equivalents.

For the avoidance of doubt, the entire contents of all documents acknowledged herein are incorporated herein by reference.

The invention claimed is:

1. A catalyst article for the treatment of an exhaust gas, the catalyst article comprising:

a wall-flow filter substrate having inlet channels open at an inlet-end of the substrate and closed at an outlet-end of the substrate, the inlet channels adjacent outlet channels which are closed at the inlet-end of the substrate and open at the outlet-end of the substrate, the wall-flow filter comprising at least first, second and third catalytic layers, wherein:

(i) the first catalytic layer extends from the inlet-end of the substrate and comprises a first SCR composition;

(ii) the second catalytic layer is provided in or on the walls of the inlet channels, extending from the inlet-end of the substrate, and comprises a PGM-containing composition, wherein:

when the second catalytic layer is provided on the walls of the inlet channel, the first catalytic layer is provided on the second catalytic layer, and when the second catalytic layer is provided in the walls of the inlet channels, the first catalytic layer is provided on the walls of the inlet channels; and (iii) the third catalytic layer is provided in or on the walls of the outlet channels, extending from the outlet-end of the substrate, and comprises a second SCR composition;

wherein a ratio of the PGMs in the second catalytic layer in g per ft$^3$ to the total amount of the first and second SCR compositions in the first and third catalytic layers in g per in$^3$ is from 1.5:8 to 5:8.

2. The catalyst article according to claim 1, wherein the second catalytic layer is provided in the walls of the inlet channels and/or the third catalytic layer is provided on the walls of the outlet channels.

3. The catalyst article according to claim 1, wherein:

(i) the first catalytic layer extends up to 100% of a longitudinal length of the substrate extending from the inlet-end to an outlet-end; and/or (ii) the second catalytic layer extends up to 100% of a longitudinal length of the substrate extending from the inlet-end to an outlet-end; and/or (iii) the third catalytic layer extends 20 to 90% of a longitudinal length of the substrate extending from the outlet-end to an inlet-end.

4. The catalyst article according to claim 3, wherein all three of the first, second and third catalytic layers extend 70 to 90% of the longitudinal length.

5. The catalyst article according to claim 1, wherein the second and third catalytic layers do not overlap and together extend 100% of a longitudinal length of the substrate extending from an outlet-end to an inlet end, preferably wherein the second catalytic layer is provided in the walls of the inlet channels and wherein the third catalytic layer is provided in the walls of the outlet channels.

6. The catalyst article according to claim 1, wherein the ratio of the PGMs in the second catalytic layer in g per $ft^3$ to the total amount of the first and second SCR compositions in the first and third catalytic layers in g per $in^3$ is about 5:16.

7. The catalyst article according to claim 1, wherein the PGM-containing composition contains Pt.

8. The catalyst article according to claim 1, wherein the PGM-containing composition comprises alumina as a support for the PGMs.

9. The catalyst article according to claim 1, wherein a catalytically active SCR components of the first and/or second SCR compositions comprises one or more metal-exchanged zeolites.

10. The catalyst article according to claim 9, wherein the metal-exchanged zeolite is a small pore zeolite having a CHA framework structure.

11. The catalyst article according to claim 1, wherein a weight ratio of the first and second SCR compositions in the first and third catalytic layers is from 2:3 to 3:2.

12. The catalyst article according to claim 1, further comprising means for electrically heating the catalyst article.

13. An exhaust-gas treatment system comprising the catalyst article according to claim 1.

14. The exhaust-gas treatment system according to claim 13, comprising in order, a catalysed soot filter (CSF), means for injecting a nitrogenous reductant, an SCR catalyst article and the catalyst article according to claim 1, preferably wherein the system further comprises a Diesel Oxidation Catalyst (DOC) upstream of the CSF.

15. A fuel combustion and exhaust treatment system comprising an engine and the exhaust-gas treatment system according to claim 13.

16. A vehicle comprising the fuel combustion and exhaust treatment system according to claim 15, wherein at least the catalyst article according to claim 1 is located in an underfloor location and/or encounters, in normal use, exhaust gases at a temperature of from 270 to 350° C.

17. A method for the treatment of an exhaust gas, the method comprising passing an exhaust gas through the catalyst article according to claim 1.

* * * * *